United States Patent [19]
Akiyama et al.

[11] Patent Number: 5,412,003
[45] Date of Patent: May 2, 1995

[54] UNSATURATED POLYESTER RESIN COMPOSITIONS, MOLDING MATERIALS, AND MOLDED PRODUCTS

[75] Inventors: Koichi Akiyama; Hiromu Miyashita, both of Kanagawa; Sanji Aoki, Nara; Ken Hatta, Aichi; Takashi Ino, Aichi; Yasuhiro Mishima, Aichi, all of Japan

[73] Assignees: Takeda Chemical Industries, Ltd., Osaka; Toyota Jidosha Kabushiki Kaisha, Aichi, both of Japan

[21] Appl. No.: 7,774

[22] Filed: Jan. 22, 1993

[30] Foreign Application Priority Data

Jan. 24, 1992 [JP] Japan .................... 4-11309

[51] Int. Cl.$^6$ ............................................. C08K 3/00
[52] U.S. Cl. .................................. 523/513; 428/430; 524/492; 524/494
[58] Field of Search ................... 523/513; 428/430; 524/492, 494

[56] References Cited

U.S. PATENT DOCUMENTS

3,365,315 1/1968 Beck et al. .................... 501/33
3,873,475 3/1975 Pechacek et al. ............ 523/509

*Primary Examiner*—John Kight, III
*Assistant Examiner*—Terressa Mosley
*Attorney, Agent, or Firm*—Wenderoth, Lind & Ponack

[57] ABSTRACT

Resin compositions containing (a) unsaturated polyester, (b) polymerizable monomer, (c) thermoplastic resin, (d) a polymerization initiator, and (e) hollow glass microspheres with a true density of 0.5 to 1.3 g/cm$^3$ and an elution alkalinity of 0.05 meq/g or less; molding materials obtained by impregnating glass fibers with such resin compositions; and molded products obtained by curing such molding materials.

The molding materials have a superior workability and are useful for the production of parts to be coated, such as automotive external body panels. The molded products are light in weight and are highly resistant to water. Defective adhesion of coating or blisters does not occur.

13 Claims, No Drawings

UNSATURATED POLYESTER RESIN COMPOSITIONS, MOLDING MATERIALS, AND MOLDED PRODUCTS

BACKGROUND OF THE INVENTION

This invention relates to unsaturated polyester resin compositions and sheet-like and bulk-like molding compounds obtained by impregnating glass fibers with such resin compositions, and molded products obtained therefrom which have superior paintability and hence are useful for coating automotive exterior body panels and other exterior parts.

Fiber-reinforced plastics (FRP) using unsaturated polyester resins have superior mechanical strength and resistance against heat, water and chemicals and hence have been extensively used, for example, in bathtubs, water tank panels and bathroom sinks. Since sheet molding compounds (SMC) and bulk molding compounds (BMC) using unsaturated polyester resins are easy to mold and have high production efficiency, they have been commonly used as FRP molding materials. In response to the increased demand for light-weight SMC and BMC, many attempts have been made recently to reduce the density of SMC and BMC. Although the most frequently used methods are by the addition of hollow glass microsphere to a resin composition, the water-resistance is significantly affected by the addition of such hollow glass microsphere in the case of automotive exterior body panels and other exterior parts (such as engine hoods, roofs, trunk lids, spoilers, air intakes and rocker panels), which are usually coated. If a molded product, thus coated, is soaked in warm water, for example, defective adhesion of the coating and blisters will occur, rendering the product unusable as a practical molded product. Moreover, although metallic oxides are frequently used with SMC and BMC as thickeners for resins in order to improve their workability, the addition of hollow glass microspheres has a significant inhibitive effect on the increase in viscosity, and it has been difficult to obtain a molding material which can be easily handled, or worked with. It is for this reason that there have been strong demands for the development of molding materials which are light in weight and have superior paintability and workability. Although a BMC containing hollow glass microspheres having an effective density of 0.3–0.4 g/cm$^3$ and treated with acid at least once, has been proposed (Japanese Patent Publication Tokkai 1-234434) as such a molding material, paintability and workability are not sufficiently improved even if this material is used. The inventors have accomplished the present invention as a result of their diligent studies into molding materials having all of these characteristics.

SUMMARY OF THE INVENTION

The inventors have conducted research to determine what kind of molding materials have all three desirable qualities, namely, lightness, superior paintability, and capability of being handled easily. As a result, it has been found that the three qualities are possessed by a molding material comprising a resin composition which contains an unsaturated polyester, a polymerizable monomer, a thermoplastic resin, a polymerization initiator, and a hollow glass microsphere. In particular, a molding material comprising glass fibers impregnated with such a resin composition is very light in weight and can be handled very easily. Also, such a molding material can be used to mold a product light in weight and having superior paintability.

DETAILED DESCRIPTION OF THE INVENTION

The present invention relates to (i) a resin composition containing (a) an unsaturated polyester, (b) a polymerizable monomer (c) a thermoplastic resin, (d) a polymerization initiator, and (e) a hollow glass microsphere with true density 0.5–1.3 g/cm$^3$ and elution alkalinity 0.05 meq/g or less; (ii) a molding material obtained by impregnating glass fibers with such a resin composition, and (iii) a molded product obtained by curing such a molding material. The foregoing resin compositions (i) are light in weight and have superior paintability and workability. In addition, they have the characteristics of FRP, that is, superior mechanical strength and resistance against heat and chemicals. Sheet-like and bulk-like molding materials (ii), obtained by impregnating glass fibers (such as those with a length of ¼ to 2 inches) with such resin compositions (i) at a ratio of 10–60 weight per cent with respect to the entire composition, have improved workability and are useful as a molding material for the production of parts to be coated such as automotive exterior body panels. Molded products (iii) obtained by curing molding materials (ii) of the present invention are light in weight and have superior resistance against water after coating and no defective adhesion of coating or blisters result.

Unsaturated polyesters (a) to be used according to the present invention are of a kind which has hitherto been used commonly and can be synthesized by condensing an $\alpha,\beta$-olefinically unsaturated dicarboxylic acid and a divalent alcohol. These polyesters can also be synthesized by using saturated dicarboxylic acids, aromatic dicarboxylic acids, or dicyclopentadiene which reacts with carboxylic acids. Examples of the $\alpha,\beta$-olefinically unsaturated dicarboxylic acid include maleic acid, fumaric acid, iraconic acid, citraconic acid, and anhydrides of these dicarboxylic acids. Examples of dicarboxylic acid which may be used together with such an a $\alpha,\beta$-olefinic unsaturated dicarboxylic acid include adipic acid, sebacic acid, succinic acid, gluconic acid, phthalic anhydride, isophthalic acid, terephthalic acid, tetrahydrophthalic arthydride, and chlorendic anhydride. Examples of divalent alcohol include alkanediols, oxaalkanediols, and diols obtained by adding alkylene oxide such as ethylene oxide and propylene oxide to bisphenol-A or hydrogenated bisphenol-A. Monovalent monools and trivalent triols may also be used. Examples of alkanediol include ethyleneglycol, 1,2-propyleneglycol, 1,3-propyleneglycol, 1,3-butanediol, 1,4-butanediol, neopentylglycol, 3-methyl-1,5-pentanediol, 1,6-hexanediol, cyclohexanediol and hydrogenated bisphenol-A. Examples of oxaalkanedimethanol include dioxyethyleneglycol, trioxyethyleneglycol, dioxypropyleneglycol and trioxypropyleneglycol. Examples of monovalent or trivalent alcohol which may be used together with such divalent alcohols include octyl alcohol, oleyl alcohol and trimethylolpropane and so on. Synthesis of unsaturated polyester is usually carried out with heating while produced water is removed. Unsaturated polyesters with an average molecular weight of 800–4000 (Note: all molecular weights referred to herein are measured by gel permeation chromatography) and an acid value of 20–60 are generally used according to the invention.

Examples of polymerizable monomers (b) which can be used for the invention are monovinyl monomers including aromatic monovinyl monomers such as styrene, p-chlorostyrene and vinyl toluene and acrylic monovinyl monomers such as acrylic acid, ethyl acrylate, butyl acrylate, 2-ethylhexyl acrylate, 2-hydroxyethyl acrylate, methacrylic acid, methyl methacrylate, isobutyl methacrylate, 2-hydroxyethyl methacrylate and acrylonitrile. Among them styrene is particularly desirable. This component (b) is usually added to the components (a) and (c) as their diluent.

The component (c) to be used according to the present invention is the kind of thermoplastic resins which have commonly been used as low profile agents for unsaturated polyester resins. Examples of such resins include polybutadienes and their hydrogenated products, polyisoprenes and their hydrogenated products, aromatic vinyl-conjugated diene block copolymers and their hydrogenated products, polystyrenes, styrene-vinyl acetate block copolymers, polyvinyl acetates and polymethyl methacrylates. Additionally, saturated polyesters (with a molecular weight of 300 to 100,000), urethane derivatives of such saturated polyesters (with a molecular weight of 2,000 to 100,000), or polyethers may also be used. The foregoing aromatic vinyl-conjugated diene block copolymers are themselves well-known polymers and can be synthesized by a known block copolymerization between aromatic vinyl monomers such as styrene, chlorostyrene, vinyl toluene or the like and conjugated diene monomers such as butadiene, isoprene or the like. Examples of such block copolymers include styrene-isoprene block copolymers, styrene-butadiene block copolymers and hydrogenated products thereof. Preferable examples of copolymers for the invention are those with molar ratio of aromatic vinyl monomer to conjugated diene monomer in the range of about 50:50-5:95 and average molecular weight in the range of about 30,000-200,000. With regard to the thermoplastic resins for the invention, styrene-butadiene block copolymers, polyvinyl acetates, saturated polyester, or urethane derivatives of saturated polyester are preferably used as such.

Thermoplastic resins to be used in the invention may be obtained by carboxylic modification of polymers described above. Polymers with carboxylic groups introduced thereinto can improve not only compatibility with unsaturated polyesters but also thickening of the compound with magnesium oxide when SMC and BMC are prepared.

The resin compositions according to the invention contain 20-40 weight parts, preferably 25-35 weight parts, of the component (a), 30-70 weight parts, preferably 40-60 weight parts, of component (b), and 5-30 weight parts, preferably 10-25 weight parts, of component (c) such that their total will be 100 weight parts.

As a polymerization initiator (d) for the present invention, at least one organic peroxide is selected, according to the desired curing speed, from tertiary butyl peroxybenzoate (TBPB), tertiary butyl peroxyoctoate (TBPO), 2,5-dimethyl-2,5-di(benzoyl peroxy)hexane (DDBPH), tertiary amyl peroxyoctoate (TAPO), tertiary butyl isopropyl carbonate (TBIPC), 1,1-bis (t-butyl peroxy)-3,3,5-trimethyl cyclohexane, 1,1-bis(t-butyl peroxy)cyclohexane, 1,1-bis(t-amyl peroxy)-3,3,5-trimethyl cyclohexane and 1,1-bis(t-amyl peroxy) cyclohexane. These initiators (d) are used at a ratio of 0.5-5 weight parts, preferably 1.0-3.0 weight parts, to the total of 100 weight parts of the components (a)-(c).

In addition to the polymerization initiators mentioned above, a curing accelerator may be used together according to the present invention. Examples of curing accelerator include organometallic compounds with metals such as cobalt, copper and manganese, as well as their octoates, naphthenates and acetylacetonates. They may be used either singly or in combination. These organometallic compounds are used at the rate of 10-1000 ppm as metal with respect to 100 weight parts for the total of components (a)-(c).

Component (e) to be used according to the present invention is hollow glass microspheres with a true density of 0.5-1.3 $g/cm^3$, preferably 0.8-1.2 $g/cm^3$, and with an elution alkalinity of 0.05 meq/g or less, preferably 0.03 meq/g or less. The true density can be measured, for example, according to ASTM D2841 procedure or the nitrogen replacement method. The elution alkalinity can be measured according to ASTM D3100-78 procedure. Although hollow glass microspheres normally contain metal oxides such as $Na_2O$ and has an elution alkalinity of about 0.10 meq/g, use is usually made of those with elution alkalinity reduced to less than 0.05 meq/g by washing them in a solution of an acid such as hydrochloric acid or sulfuric acid and/or by using a coupling agent to carry out a surface treatment. Hollow glass microspheres with 10%-breakage pressure greater than 120 $kgf/cm^2$, particularly greater than 240 $kgf/cm^2$ are desirable. Those with average particle diameter 5-100 $\mu m$, and in particular 5-50 $\mu m$, are preferable. Although the amount of component (e) to be added depends on the true density of the hollow glass microspheres and the density of a product to be molded, it is usually 5-100 weight parts, particularly 10-80 weight parts, more particularly 20-60 weight parts, against 100 weight parts for the total of components (a)-(c).

Alkanepolyol polymethacrylates or alkanepolyol polyacrylates may be added to the resin composition of the invention to improve the surface quality. Examples of such substances include dimethacrylates or diacrylates of alkanepolyols having 2-12 carbon atoms such as ethyleneglycol dimethacrylate, diethyleneglycol dimethacrylate, triethyleneglycol dimethacrylate, propyleneglycol dimethacrylate, dipropyleneglycol dimethacrylate, 1,4-butanediol dimethacrylate, neopentylglycol dimethacrylate, 1,6-hexanediol dimethacrylate, ethyleneglycol diacrylate, diethyleneglycol diacrylate, triethyleneglycol diacrylate, propyleneglycol diacrylate, 1,4-butanediol diacrylate, neopentylglycol diacrylate, 1,6-hexanediol diacrylate, trimethylolpropane dimethacrylate, glycerine dimethacrylate, pentaerythritol dimethacrylate, trimethylolpropane diacrylate, glycerine diacrylate, and pentaerythritol diacrylate. Further examples include polymethacrylates and polyacrylates of alkanepolyols having 3-12 carbon atoms such as trimethylolpropane trimethacrylate, glycerine trimethacrylate, pentaerythritol trimethacrylate, glycerine triacrylate, pentaerythritol triacrylate, pentaerythritol tetramethacrylate, dipentaerythritol hexamethacrylate, pentaerythritol tetraacrylate and dipentaerythritol hexaacrylate. They are added at the rate of 1-15 weight parts or preferably 3-10 weight parts with respect to 100 weight parts for the total of components (a)-(c).

Fillers, pigments, or thickeners may be added to such resin compositions if necessary. Examples of fillers include calcium carbonate, aluminum hydroxide, talc, silica, clay, glass power and so on. Examples of pigment include titanium oxide, carbon black, iron oxide red, phthalocyanine blue, and so on.

Molding materials such as SMC and BMC can be obtained from resin compositions containing such additives of many kinds by using known facilities and method to impregnate glass fibers (for example, of diameter about 8–20 microns and length ¼–2 inches) therewith. Glass fibers are usually used at the rate of 10–60 weight % with respect to the total weight of the molding material. Molding materials of the present invention can be compression-molded with heating in a mold (under a pressure of 20–120 kgf/cm$^2$ and at a temperature of 110°–180° C.) to produce molded products.

The unsaturated polyester resin compositions and the molding materials obtained by impregnating glass fibers with them are light in weight and have a high workability and superior paintability. For this reason, they are extremely useful as molding materials for the production of molded products such as automotive exterior body panels that are to be coated.

EXAMPLES

The invention will now be described in more detail by way of test examples.

Test Examples 1–7 and Comparative Examples 1–5

Sheet molding compounds (SMC) were prepared by using the components of Table 1. In Table 1, the unsaturated polyester resin A is a styrene solution of unsaturated polyester synthesized from propyleneglycol and maleic anhydride, containing 30 weight per cent of styrene and having a viscosity of 820 cps at a temperature of 25° C. and an acid value of 16.5. Unsaturated polyester resin B is a styrene solution of unsaturated polyester synthesized from 1.0 mole of propyleneglycol, 0.2 mole of dicyclopentadiene, and 1.0 mole of maleic anhydride, containing 35 weight % of styrene and having a viscosity of 650 cps at a temperature 25° C. and an acid value of 21. The styrene-butadiene block copolymer solution comprises 30 weight parts of copolymer and 70 weight parts of styrene with a viscosity of 28,000 cps at 25° C. This copolymer had an average molecular weight of 120,000, comprising 15 weight % of styrene component and 85 weight % of butadiene component, and having 0.5 weight % of carboxyl group. The polyvinyl acetate solution comprises 40 weight parts of vinyl acetate polymer and 60 weight parts of styrene. The average molecular weight of the vinyl acetate polymer was 40,000. Hollow glass microspheres A–C had an average particle diameter of 40 μm, a true density of 0.50 g/cm$^3$, a 10%-breakage pressure of 240 kgf/cm$^2$ and an elution alkalinity as shown in Table 1. Hollow glass microspheres D and E had an average particle diameter of 8 μm, a true density of 1.10 g/cm$^3$, a 10%-breakage pressure of more than 700 kgf/cm$^2$ and an elution alkalinity as shown in Table 1.

Comparative Examples 1–5 are cases where hollow glass mirospheres with elution alkalinity outside the range according to the present invention.

Viscosity of resin compositions was measured at a temperature of 40° C. by using a viscometer (Model BHT produced by Brookfield Co. ) with T-F rotor at 2.5 rpm after magnesium oxide was added to the resin composition as a thickener and it was matured for a specified length of time inside a thermostatic container at 40° C.

Regarding the workability of SMC, those with practically no stickness and good workability are indicated by "A", those which are workable although with some stickiness are indicated by "B", and those which are strongly sticky and difficult to work with are are indicated by "C."

Each SMC was compression-molded at a pressure of 80 kgf/cm$^2$ and a flow time of 9 seconds to produce flat-panels (300 mm ×300 mm×2 mm). In melamine coating, melamine alkyd paint was coated, and baked at 140° C. In urethane coating, a urethane paint was coated, and baked at 80° C. After each coated SMC panel was soaked in warm water of 40° C. for 10 days, the number of blisters formed on the coated surface was counted, and adhesiveness was evaluated by a crosscut adhesion test.

As shown in Table 1, the SMCs according to the invention have superior workability, and the molded products therefrom are light in weight and have extremely superior paintablity.

TABLE 1

| | Test Examples | | | | | | |
|---|---|---|---|---|---|---|---|
| | 1 | 2 | 3 | 4 | 5 | 6 | 7 |
| 1) Composition | | | | | | | |
| (a) unsaturated polyester resin A | 43 | 43 | 43 | — | 43 | 43 | 43 |
| unsaturated polyester resin B | — | — | — | 46 | — | — | — |
| (b) styrene | 7 | 7 | 7 | 4 | 19 | 2 | 2 |
| (c) styrene/butadiene block copolymer solution | 50 | 50 | 50 | 50 | — | 50 | 50 |
| polyvinyl acetate solution | — | — | — | — | 38 | — | — |
| (d) 1,1-bis(t-butylperoxy)-3,3,5-trimethyl cyclohexane | 1 | 1 | 1 | 1 | 1 | 1 | — |
| t-butylperoxy benzoate | — | — | — | — | — | — | 1.5 |
| (e) hollow glass microsphere | | | | | | | |
| A *1 | 22 | — | — | 22 | 22 | 22 | 22 |
| B *2 | — | 22 | — | — | — | — | — |
| C *3 | — | — | — | — | — | — | — |
| D *4 | — | — | 70 | — | — | — | — |
| E *5 | — | — | — | — | — | — | — |
| (f) cobalt acetyl | — | — | — | — | — | — | 0.03 |

TABLE 1-continued

|  | Test Examples | | | | | | |
|---|---|---|---|---|---|---|---|
|  | 1 | 2 | 3 | 4 | 5 | 6 | 7 |
| acetonate | | | | | | | |
| (g) trimethylolpropane trimethacrylate | — | — | — | — | — | 5 | 5 |
| (h) p-benzoquinone | 0.02 | 0.02 | 0.02 | 0.02 | 0.02 | 0.02 | 0.02 |
| (i) calcium carbonate | 100 | 100 | 60 | 100 | 100 | 100 | 100 |
| (j) magnesium oxide | 1 | 1 | 1 | 1 | 1 | 1 | 1 |
| (k) glass fiber 6* | 28% | 28% | 28% | 28% | 28% | 28% | 28% |
| 2) Viscosity of resin composition (40° C., × 10000 cps) | | | | | | | |
| after 24 hours | 896 | 512 | 928 | 704 | 1024 | 864 | 896 |
| after 48 hours | 1376 | 864 | 1408 | 1216 | 1536 | 1184 | 1360 |
| after 72 hours | 1856 | 1216 | 2144 | 1408 | 2464 | 1760 | 1732 |
| 3) Workability of SMC | "A" | "A" | "A" | "A" | "A" | "A" | "A" |
| 4) Density of products molded from SMC (g/cm$^3$) | 1.50 | 1.51 | 1.51 | 1.50 | 1.51 | 1.52 | 1.51 |
| 5) Water resistance of coated panels (after soaking for 10 days in warm water at 40° C.) *7 | | | | | | | |
| (melamine coating) | | | | | | | |
| Adhesiveness | 0/100 | 0/100 | 0/100 | 0/100 | 0/100 | 0/100 | 0/100 |
| No. of blisters | 0 | 0 | 0 | 0 | 0 | 0 | 0 |
| (urethan coating) | | | | | | | |
| Adhesiveness | 0/100 | 0/100 | 0/100 | 0/100 | 0/100 | 0/100 | 0/100 |
| No. of blisters | 0 | 0 | 0 | 0 | 0 | 0 | 0 |

TABLE 2

|  | Comparative Examples | | | | |
|---|---|---|---|---|---|
|  | 1 | 2 | 3 | 4 | 5 |
| 1) Composition | | | | | |
| (a) unsaturated polyester resin A | 43 | 43 | — | 43 | 43 |
| unsaturated polyester resin B | — | — | 46 | — | — |
| (b) styrene | 7 | 7 | 4 | 7 | 19 |
| (c) styrene/butadiene block copolymer solution | 50 | 50 | 50 | 50 | — |
| polyvinyl acetate solution | — | — | — | — | 38 |
| (d) 1,1-bis(t-butylperoxy)-3,3,5-trimethyl cyclohexane | 1 | 1 | 1 | 1 | 1 |
| t-butylperoxy benzoate | — | — | — | — | — |
| (e) hollow glass microsphere | | | | | |
| A *1 | — | — | — | — | — |
| B *2 | — | — | — | — | — |
| C *3 | 22 | — | 22 | 22 | 22 |
| D *4 | — | — | — | — | — |
| E *5 | — | 70 | — | — | — |
| (f) cobalt acetyl acetonate | — | — | — | — | — |
| (g) trimethylolpropane trimethacrylate | — | — | — | — | — |
| (h) p-benzoquinone | 0.02 | 0.02 | 0.02 | 0.02 | 0.02 |
| (i) calcium carbonate | 100 | 60 | 100 | 100 | 100 |
| (j) magnesium oxide | 1 | 1 | 1 | 3 | 1 |
| (k) glass fiber 6* | 28% | 28% | 28% | 28% | 28% |
| 2) Viscosity of resin composition (40° C., × 10000 cps) | | | | | |
| after 24 hours | 12 | 125 | 97 | 389 | 125 |
| after 48 hours | 145 | 248 | 186 | 574 | 354 |
| after 72 hours | 282 | 369 | 361 | 766 | 582 |
| 3) Workability of SMC | "C" | "C" | "C" | "B" | "C" |
| 4) Density of products molded from SMC (g/cm$^3$) | 1.51 | 1.51 | 1.52 | 1.51 | 1.50 |
| 5) Water resistance of coated panels (after soaking for 10 days in warm water at 40° C.) *7 | | | | | |

TABLE 2-continued

|  | Comparative Examples | | | | |
|---|---|---|---|---|---|
|  | 1 | 2 | 3 | 4 | 5 |
| (melamine coating) | | | | | |
| Adhesiveness | 15/100 | 13/100 | 32/100 | 38/100 | 19/100 |
| No. of blisters | 89 | 75 | 115 | 63 | 77 |
| (urethan coating) | | | | | |
| Adhesiveness | 45/100 | 32/100 | 39/100 | 47/100 | 23/100 |
| No. of blisters | 58 | 47 | 68 | 51 | 44 |

In Tables 1 and 2:
*1: true density = 0.50; elution alkalinity = 0.020 meq/g
*2: true density = 0.50; elution alkalinity = 0.050 meq/g
*3: true density = 0.50; elution alkalinity = 0.080 meq/g
*4: true density = 1.10; elution alkalinity = 0.020 meq/g
*5: true density = 1.10; elution alkalinity = 0.075 meq/g
*6: diameter = 13 microns; length = 1 inch
*7: adhesiveness by crosscut adhesion test, expressed by (number of peels)/100
No. of blisters: number of blisters within molded and coated panel of 300 mm x 300 mm

What is claimed is:

1. A resin composition containing (a) 20–40 weight parts of an unsaturated polyester, (b) 30–70 weight parts of stryene, (c) and 5–30 weight parts of a thermoplastic resin, wherein said thermoplastic resin is (i) styrene-butadiene block copolymer, (ii) polyvinyl acetate, (iii) a saturated polyester with a molecular weight of 300 to 100,000, or (iv) a urethane derivative of such a saturated polyester with a molecular weight of 2,000 to 100,000; and wherein said molecular weight is determined by gel permeation chromatography, such that the three components (a) to (c) make up a total of 100 parts by weight, (d) and also containing 0.1–5.0 weight parts of a polymerization initiator, wherein said polymerization initiator is at least one organic peroxide selected from the group consisting of tertiary butyl peroxybenzoate, tertiary butyl peroxy-octoate, 2,5-dimethyl-2,5-di(benzoyl peroxy)hexane, tertiary amyl peroxyoctoate, tertiary butyl isopropyl carbonate, 1,1-bis(t-butyl peroxy)-3,3,5-trimethyl cyclohexane, 1,1-bis(t-butyl peroxy)cyclohexane, 1,1-bis(t-amyl peroxy)-3,3,5-trimethyl cyclohexane and 1,1-bis(t-amyl peroxy)cyclohexane, and (e) 5–100 weight parts of hollow glass microspheres with a true density of 0.5–1.3 g/cm$^3$ and an elution alkalinity reduced to less than 0.05 meq/g by using at least one of the methods selected from the group consisting of washing normal hollow glass microspheres in a solution of an acid and using a coupling agent to carry out a surface treatment.

2. A resin composition of claim 1 wherein the unsaturated polyester (a), the polymerizable monomer (b), and the thermoplastic resin (c) are used by 25 to 35 parts by weight, 40 to 60 parts by weight, and 10 to 25 parts by weight, respectively, such that the three components (a) to (c) make up a total of 100 parts by weight, and in addition the polymerization initiator (d) and the hollow glass microspheres (e) are used by 0.1 to 5.0 parts by weight and 5 to 100 parts by weight, respectively.

3. A resin composition in accordance with claim 1 wherein the hollow glass microspheres have a true density of 0.8 to 1.2 g/cm$^3$ and an elution alkalinity of 0.03 meq/g or less.

4. A resin composition in accordance with claim 1 wherein the hollow glass microspheres have an average particle diameter of 5 to 100 μm.

5. A resin composition in accordance with claim 1 wherein the hollow glass microspheres have a 10%-breakage pressure of 120 kgf/cm$^2$ or more.

6. A resin composition in accordance with claim 1 wherein the unsaturated polyester (a), the polymerizable monomer (b), and the thermoplastic resin (c) make up a total of 100 parts by weight while the hollow glass microspheres (e) are used by 10 to 80 parts by weight.

7. A resin composition in accordance with claim 1 wherein the unsaturated polyester has an average molecular weight of 800 to 4,000 and an acid value of 20 to 60; and wherein said molecular weight is determined by gel permeation chromatography.

8. A resin composition of claim 1 further containing alkanepolyol polyacrylate or alkanepolyol polymethacrylate.

9. A molding material obtained by impregnating glass fibers with a resin composition of claim 1.

10. A molding material in accordance with claim 9 wherein 10 to 60 per cent by weight of the glass fibers, relative to the whole amount of the resin composition, are used.

11. A molded product obtained by curing the molding material of claim 9.

12. A molded product of claim 11 having a density of 1.2 to 1.7 g/cm$^3$.

13. A resin composition in accordance with claim 1 wherein the acid solution used to wash the normal hollow glass microspheres is a sulfuric or a hydrochloric acid solution.

* * * * *